(12) United States Patent
Bertz et al.

(10) Patent No.: US 8,560,720 B1
(45) Date of Patent: **\*Oct. 15, 2013**

(54) REAL-TIME TRANSPORT PROTOCOL AD CUE EXTENSIONS

(75) Inventors: Lyle T. Bertz, Lee's Summit, MO (US);
Yaojun Sun, South Riding, VA (US);
Christopher J. Mateski, Overland Park, KS (US); Chuma U. Agogbua, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,844

(22) Filed: Jul. 25, 2012

Related U.S. Application Data

(63) Continuation of application No. 12/136,810, filed on Jun. 11, 2008, now Pat. No. 8,260,950.

(51) Int. Cl.
*G06F 15/16* (2006.01)

(52) U.S. Cl.
USPC .............. 709/231; 725/32; 725/118; 725/119

(58) Field of Classification Search
USPC .......................................................... 709/231
See application file for complete search history.

(56) References Cited

U.S. PATENT DOCUMENTS

| | | | |
|---|---|---|---|
| 5,283,639 A * | 2/1994 | Esch et al. ...................... | 725/32 |
| 7,511,846 B2 * | 3/2009 | Hart et al. ..................... | 358/1.15 |
| 2003/0190961 A1 * | 10/2003 | Seidman ......................... | 463/43 |
| 2003/0199292 A1 * | 10/2003 | Greenberg ....................... | 463/1 |
| 2006/0075449 A1 * | 4/2006 | Jagadeesan et al. .......... | 725/113 |
| 2007/0055983 A1 * | 3/2007 | Schiller et al. .................. | 725/32 |
| 2007/0130590 A1 * | 6/2007 | Nash-Putnam ................. | 725/63 |
| 2009/0094634 A1 * | 4/2009 | Haberman et al. ............. | 725/32 |
| 2013/0042265 A1 * | 2/2013 | Copley et al. ................... | 725/32 |

\* cited by examiner

*Primary Examiner* — Tauqir Hussain

(57) ABSTRACT

Provides for delivery and synchronization of an ad to a user of a streaming media. An embodiment uses a transport protocol header extension to provide an ad cue to a splicer for the delivery of an ad within a primary media stream (the stream containing the header extension) or in an ancillary stream. An existing ancillary stream may be used, or a new ancillary stream may be initiated in response to the ad cue. The ad may have a variety of formats such as takeover, overlay, standard banner, and rich media.

12 Claims, 6 Drawing Sheets

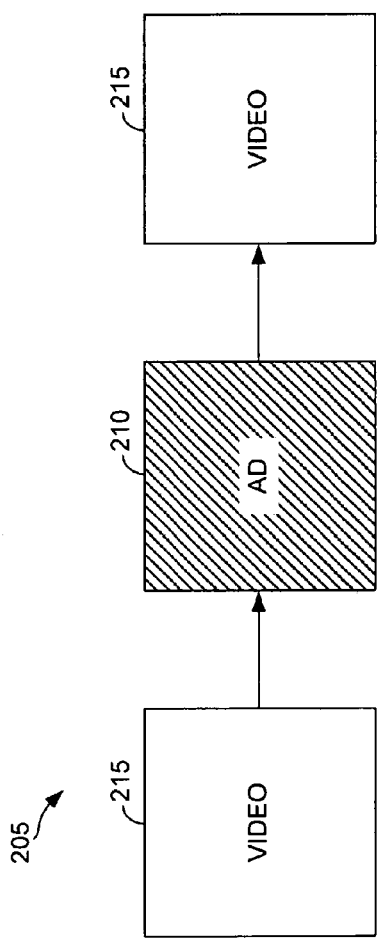
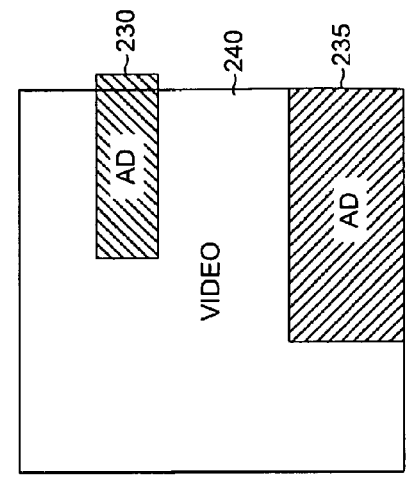
FIG. 2a.
FIG. 2b.

REAL-TIME TRANSPORT PROTOCOL AD CUE EXTENSIONS

CROSS-REFERENCE TO RELATED APPLICATIONS

This application is a continuation of U.S. patent application Ser. No. 12/136,810, filed Jun. 11, 2008, entitled "Real-Time Transport Protocol Ad Cue Extensions," which is herein incorporated by reference.

SUMMARY

The present invention is defined by the claims below. An embodiment of the present invention provides delivery and synchronization of an ad to a user of a primary media stream, either within streaming media or external to the streaming media.

In a first aspect, computer-readable media are provided for facilitating a method for delivering an ad to a user of a primary media stream. The method includes receiving a primary media stream that includes a transport protocol. A cue point, defined in the transport protocol, is identified, for an ad to be inserted into at least one of the primary media stream or a secondary media stream. The transport protocol includes an ad-type field that indicates a type of ad format that is allowable in response to the cue point. A group of timing bits in the transport protocol is decoded to determine a delivery time of the ad with respect to a content of the primary stream. A group of bits within the transport protocol is decoded to determine a starting point and an ending point of the ad with respect to a point in the primary media stream. At least one of the primary media stream or the secondary media stream is selected based on information in the transport protocol. The ad is selected based at least on the type of ad format that is allowable. The ad is inserted by way of a splicer in at least one of the primary media stream or the secondary media stream that was selected. The ad is delivered to the user.

In a second aspect, a system is provided for delivering an ad to a user of a primary media stream. The system includes the primary media stream connected to a splicer. The system also includes a transport protocol within the primary media stream. The transport protocol defines a cue point at which the ad is to be delivered to the user, and includes one or more fields that define aspects of the cue point. A group of bits is encoded within the transport protocol specifying at least one of a starting point and an ending point of the ad, with respect to a point in the primary media stream. The system further includes a media presentation device that is operable to A) receive at least one of the primary media stream or a secondary media stream, B) retrieve the ad from an external source other than the primary media stream and the secondary media stream, and C) present to the user at least one of the primary media stream, the secondary media stream, or the ad from the external source. The system includes the splicer that is operable to A) receive the primary media stream, B) identify the cue point, including decoding a group of timing bits in the transport protocol to determine a delivery time of the ad with respect to a content of the primary stream, C) transmit the primary media stream to the user, and D) transmit the ad to the user in at least one of the primary media stream or the secondary media stream based on information in the transport protocol.

In a third aspect, computer-readable media are provided for facilitating a method of delivering an ad to a user of a primary media stream. The method includes receiving the primary media stream which has, within a transport protocol, a transport protocol header extension that defines an ad cue point. One or more fields within the header extension that define aspects of the ad cue point are interpreted. A limit field indicates a maximum number of ads that may be played in response to the ad cue point. Interpreting the one or more fields includes decoding a group of timing bits to determine a delivery time of the ad. The ad is transmitted at the ad cue point in at least one of the primary media stream or a secondary media stream, based on information in the transport protocol header extension.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIGS. 2A-2C depict block diagrams illustrative of various ad formats suitable for use in implementing an embodiment of the present invention;

DETAILED DESCRIPTION

Figure 1:
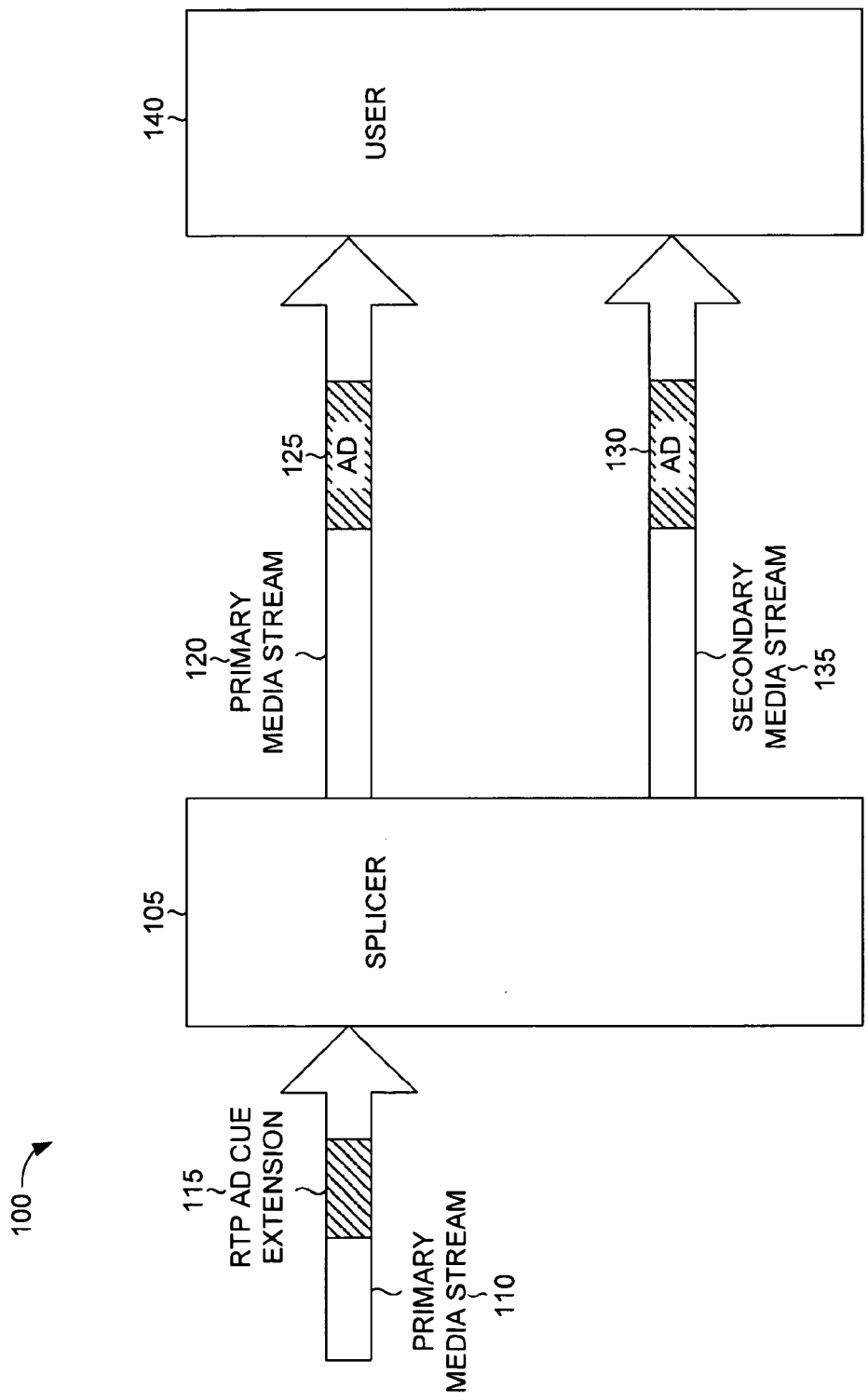
FIG. 1 is a block diagram of an exemplary system suitable for use in implementing an embodiment of the present invention.

An embodiment of the present invention may provide systems, methods and apparatuses for ad cues in streaming media. This is analogous to digital programming insertion in cable television broadcasting. A description of digital programming insertion may be found in specifications ANSI/SCTE 35 2004 Digital Program Insertion Cueing Message for Cable by the Society of Cable Telecommunications Engineers, Inc. of Exton, Pa. and ANSI/SCTE 30 2006 Digital Program Insertion Splicing API by the Society of Cable Telecommunications Engineers, Inc. of Exton, Pa., which are incorporated herein by reference. An embodiment of the present invention extends ad cues to enable the delivery and synchronization of an ad to a user within a streaming media and also external to the streaming media, in multiple formats and from multiple sources by means of an ad cue implemented as a Real-time Transport Protocol (RTP) header extension in an RTP media stream. It will be apparent to one skilled in the art upon reading, and because of, this disclosure that an embodiment of the invention is not limited to RTP and may use any communication protocol suitable for delivering media over an Internet Protocol (IP) network.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ANSI American National Standards Institute

CD-ROM Compact Disc read-only memory
DVD Digital Versatile Disc
EEPROM Electrically Erasable Programmable Read-Only Memory
HTTP Hypertext Transfer Protocol
IP Internet Protocol
IPTV Internet Protocol Television
RAM Random Access Memory
ROM Read Only Memory
RTP Real-time Transport Protocol
SCTE Society of Cable Telecommunications Engineers
SLA Service Level Agreement
TCP/IP Society of Cable Telecommunications Engineers Further, various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, an embodiment of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The particular embodiments herein are intended in all respects to be illustrative rather than restrictive. Alternative embodiments will become apparent to those skilled in the art to which the present invention pertains without departing from its scope, upon reading, and because of, this disclosure.

In traditional television broadcasting, an insertion point for a local ad is indicated to a local broadcaster by means of cue tones. A cue tone indicates the point at which a video ad may be inserted into the broadcast video. As with traditional television broadcasting, it is desirable in Internet Protocol Television (IPTV) broadcasting to deliver an ad to a user, but in a variety of formats.

RTP provides a means for delivering audio and video data over an Internet Protocol network. The RTP specification provides for user-defined header extensions that may contain other types of information. An embodiment of the present invention may provide apparatuses, systems and methods for using an RTP header extension to indicate a cue point, in IPTV broadcasting, for an ad in any of a variety of formats. Unlike a traditional cue point, which defines an ad insertion point in a primary media stream, an embodiment of the present invention provides a cue point that indicates the delivery of an ad to a user within the primary media stream, within an ancillary stream, or from other sources (such as an exemplary HTTP connection) accessed by a media player. One skilled in the art will recognize that protocols other than RTP may be used in implementing an embodiment of the present invention.

Referring to the drawings in general, and initially to FIG. 1 in particular, an exemplary system suitable for use in implementing an embodiment of RTP ad cue extensions is shown and designated generally as ad cue system 100. Ad cue system 100 is but one example of a suitable ad cue system and is not intended to suggest any limitation as to scope of use or functionality. Neither should the ad cue system 100 be interpreted as having any dependency or requirement relating to any one or combination of components or modules illustrated. It will be appreciated by one skilled in the art that protocols other than RTP may be used in implementing ad cue system 100 and other systems that are embodiments of the present invention.

Ad cue system 100 is an exemplary system for using RTP ad cue extensions to deliver an ad, in a variety of formats, to a user of streaming media. With continued reference to FIG. 1, ad cue system 100 comprises a splicer 105 configured to: receive programming in primary media stream 110 containing an RTP ad cue extension 115, transmit programming in primary media stream 120 with an ad 125 inserted into it, and transmit an ad 130 in a secondary media stream 135. The programming and ads are transmitted to a user 140. User 140 may be a computing device capable of at least receiving the streaming media and the ad. The computing device may also present the media and the ad to a viewer or listener.

In one embodiment, the streaming media is carried in RTP format, with RTP header extensions (ad cue extensions) indicating ad cue points. The splicer will deliver ads to the user as directed by the information contained in the ad cue points, with specified timing and ad format. Exemplary formats may include, but are not limited to, overlay, takeover, rich media, and standard banner.

Figure 2C:
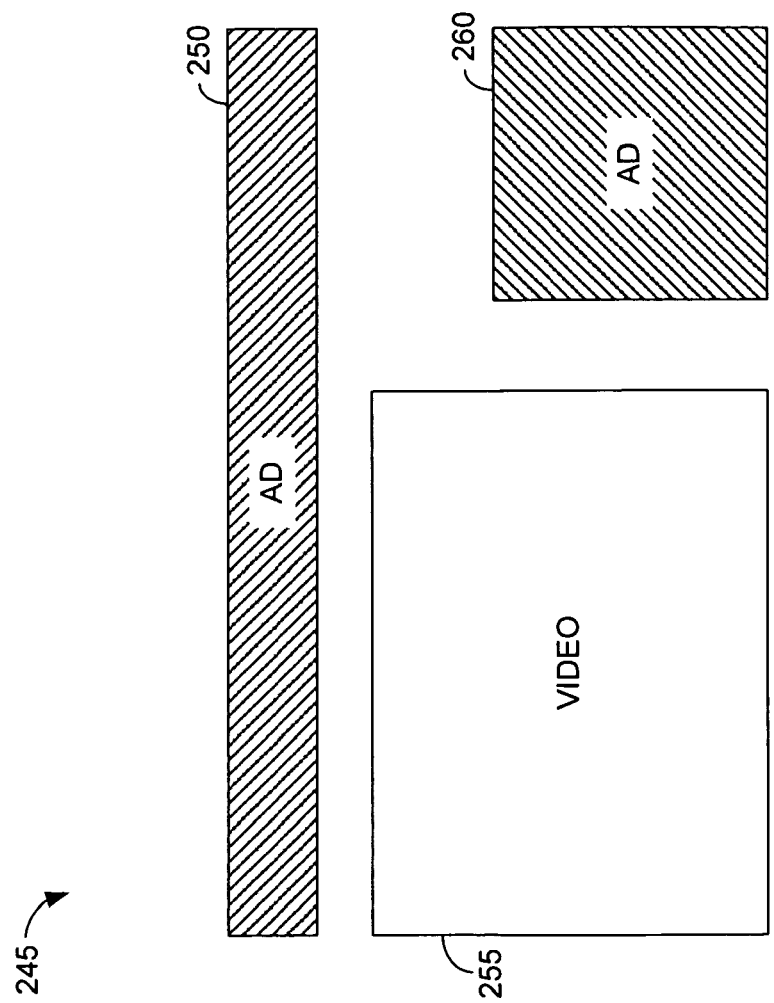

Exemplary ad formats suitable for use in implementing some embodiments of RTP ad cue extensions are shown in FIGS. 2A-2C and are designated generally as ad formats 205, 225, and 245. Ad formats 205, 225, and 245 are but examples of suitable ad formats and are not intended to suggest any limitation as to scope of use or functionality. Neither should the ad formats 205, 225, and 245 be interpreted as having any dependency or requirement relating to any one or combination of components or modules illustrated. One skilled in the art will recognize that protocols other than RTP may be used in implementing ad cue extensions for the exemplary ad formats illustrated in FIGS. 2A-2C as well as other suitable ad formats.

FIG. 2A illustrates an exemplary takeover ad 210, which is inserted into the video stream in such a way that the video 215 is paused while the ad 210 is displayed, and the video 215 resumes once the ad 210 completes. FIG. 2B illustrates exemplary overlay ads 230 and 235, showing how they are displayed with respect to the video 240. Overlay ads 230 and 235 are also inserted into the video stream, but are displayed along with the video 240. They are transparent and may be positioned anywhere on the displayed video 240. FIG. 2C illustrates exemplary ads that are external to the video stream. An exemplary standard banner ad 250 is displayed separately from the video 255. The standard banner ad 250 may also be a sync ad, i.e., an ad that is relevant to the video being played. An exemplary rich media ad 260 is also displayed separately from the video. Rich media ads typically use various formats such as audio, video, animation, and interaction with the user.

While takeover ads and overlay ads are inserted into the primary media stream, an external ad is transmitted either in an existing media stream other than the primary media stream, or a new stream may be initiated in which to transmit the ad. Alternatively, the splicer may direct the media player to retrieve the ad from another web source.

Figure 3:
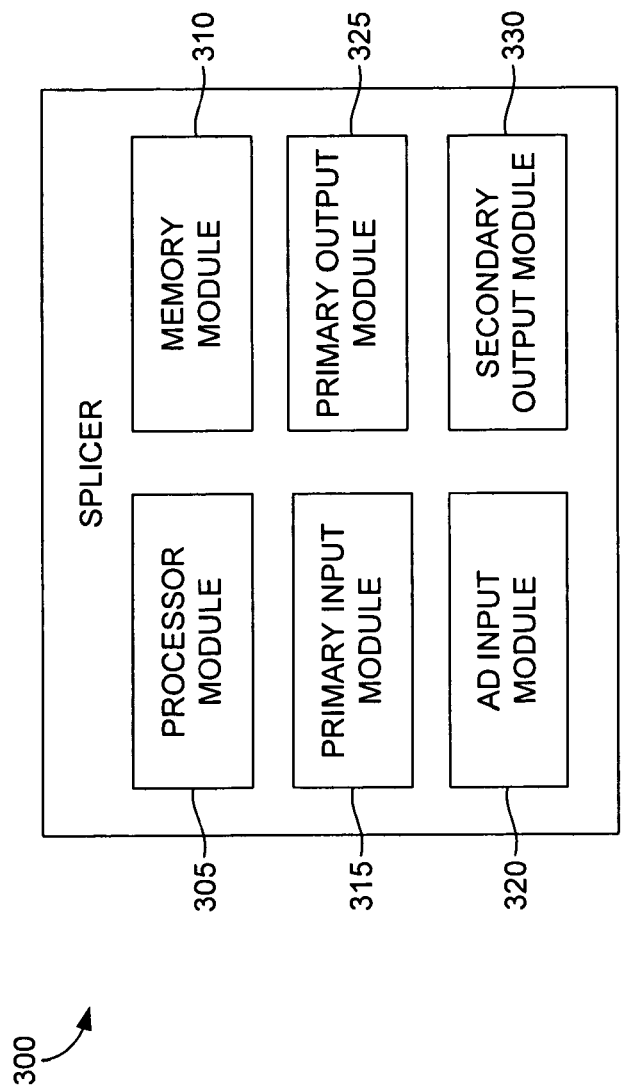
FIG. 3 is a block diagram illustrative of an exemplary splicer suitable for use in implementing an embodiment of the present invention.

Referring now to FIG. 3, an exemplary apparatus suitable for use in implementing an embodiment of RTP ad cue extensions is depicted, designated generally as splicer 300. The splicer 300 is but one example of a suitable splicer and is not intended to suggest any limitation as to scope of use or functionality. Neither should the splicer 300 be interpreted as having any dependency or requirement relating to any one or combination of components or modules illustrated. It will be apparent to one skilled in the art that protocols other than RTP may be used in implementing the splicer 300 and other apparatuses suitable for use in an embodiment of the present invention.

By way of background, a traditional splicer is a device for inserting programming or ads into broadcast programming such as in cable television. A splicer typically is used by a broadcast affiliate to insert local ads or programming into regionally broadcast programming. The broadcast programming is received on a primary channel of the splicer, and ads or other programming to be inserted are received on an insertion channel. An upcoming insertion point in the broadcast programming is indicated to the splicer by some means, such as a cue embedded in the broadcast programming. The splicer requests an ad from an ad server, which then sends the ad to the splicer over the insertion channel. The ad is inserted by the splicer into the media stream at the insertion point. Splicer operation for broadcast cable programming is more fully addressed in the aforementioned references ANSI/SCTE 35 2004 and ANSI/SCTE 30 2006.

With continued reference to FIG. 3, the splicer 300 includes a processor module 305, a memory module 310, a primary input module 315, an ad input module 320, a primary output module 325, and a secondary output module 330. The primary input module 315 receives streaming media formatted in RTP or other suitable protocol. Ad cues contained in header extensions in the stream are decoded by the splicer to determine the type of ad to be delivered and the timing of the ad. An ad is received by the ad input module 320. Depending on the ad type indicated by the ad cue, the ad may be inserted into the streaming media and transmitted by the primary output module, or the ad may be transmitted by the secondary output module. The secondary output module may make use of a preexisting media stream or initiate a new media stream.

Figure 4:
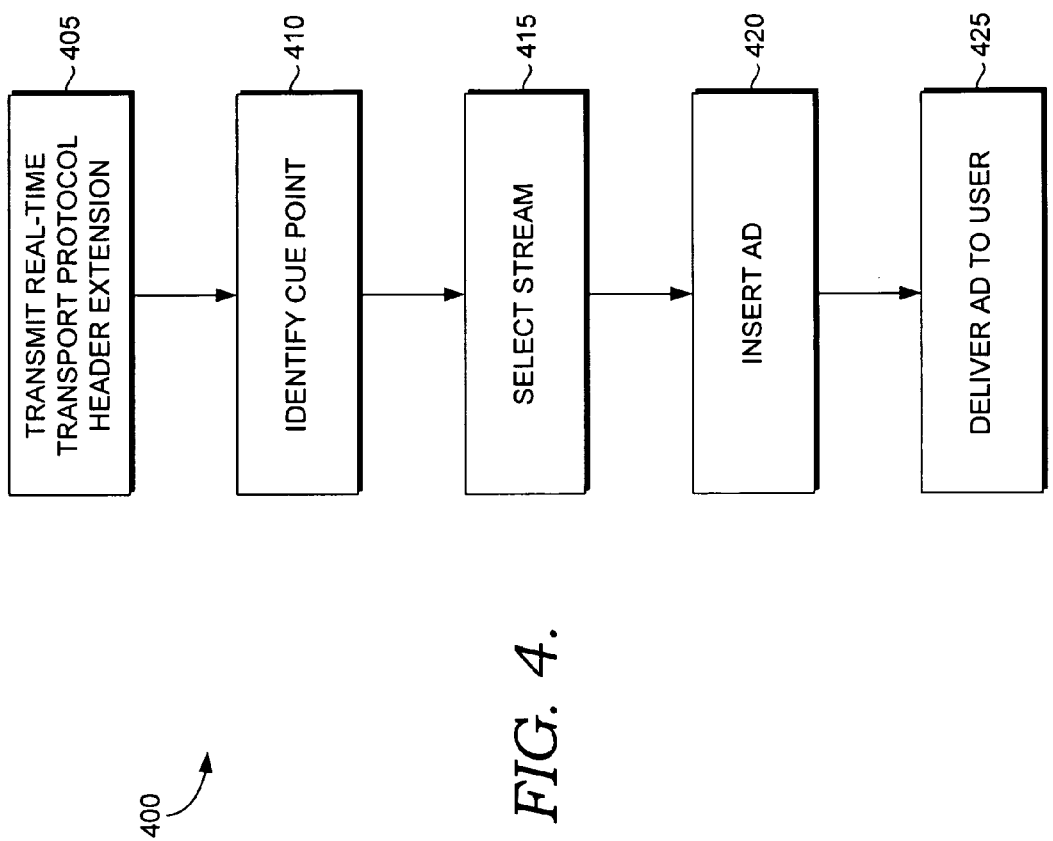
FIG. 4 is a flowchart illustrative of an exemplary method suitable for use in implementing an embodiment of the present invention.

FIG. 4 depicts an exemplary method suitable for use in implementing an embodiment of RTP ad cue extensions and is generally designated as ad cue method 400. The ad cue method 400 is but one example of a suitable ad cue method and is not intended to suggest any limitation as to scope of use or functionality. Neither should the ad cue method 400 be interpreted as having any dependency or requirement relating to any one or combination of components or modules illustrated. One skilled in the art will recognize that protocols other than RTP may be used in implementing the ad cue method 400 and other methods that are embodiments of the present invention.

With continued reference to FIG. 4, at step 405 an RTP header extension, in which an ad cue is encoded, is transmitted in a media stream formatted with RTP or other suitable protocol. The media stream is received by a splicer, and the cue point is identified at step 410 for an ad to be inserted into the media stream or transmitted in a secondary media stream. Identifying a cue point may consist of recognizing the RTP header extension and decoding the bits within that header extension that specify the type of ad to be delivered and the associated timing information. A media stream is selected, at step 415, based on the type of ad designated by the ad cue. The ad is inserted into the selected stream at step 420 and delivered to the user at step 425. Delivering the ad to the user may be, but is not limited to, transmitting the ad to a media player or other computing device.

Figure 5:
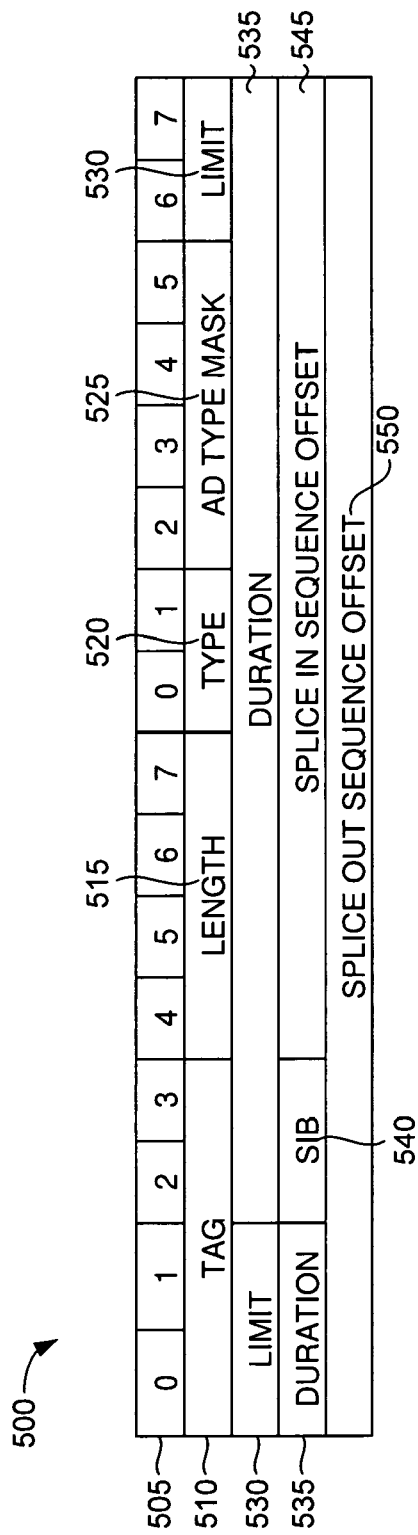
FIG. 5 is a block diagram illustrative of an exemplary protocol header extension format suitable for use in implementing an embodiment of the present invention.

An exemplary RTP header extension format suitable for use in implementing an embodiment of RTP ad cue extensions is shown in FIG. 5 and is generally designated as header extension format 500. The header extension format 500 is but one example of a suitable header extension format and is not intended to suggest any limitation as to scope of use or functionality. Neither should the header extension format 500 be interpreted as having any dependency or requirement relating to any one or combination of components or modules illustrated. In other embodiments, some data fields may be omitted or other data fields may be defined. It will be appreciated by one skilled in the art that protocols other than RTP may be used in implementing the header extension format 500 and other protocol formats that are embodiments of the present invention.

With continued reference to FIG. 5, the top row 505 of header extension format 500 is not part of the data in the header extension, it merely serves to designate the bit positions of the exemplary data fields in the header extension. Other embodiments may define these or other data fields in other bit positions and formats.

The TAG field 510 is an exemplary 4-bit label, defined by the user, identifying the header extension. The value of the TAG field 510 does not affect the ad cue, other than identifying it to whatever system, method or apparatus is making use of the ad cue.

The LENGTH field 515 is an exemplary 4-bit value indicating the length of the header extension in 32-bit words, exclusive of the first 32-bit word of the header extension. In one embodiment, the value of the LENGTH field 515 is one, or a binary value of 0001, because the header extension is defined as having a total of 64 bits. Other embodiments may be defined such that the LENGTH field 515 takes on other values.

The TYPE field 520 is an exemplary 2-bit field indicating the type of the ad cue.

In one embodiment, the bit definitions, in binary format, for the TYPE field 520 are as follows: a value of 00 indicates a Splice In point, which signifies that an ad is to begin at the designated point in the media stream; a value of 01 indicates a Splice Out point, which signifies that an ad is to end at the designated point; a value of 10 indicates an Informational ad cue, which may convey other information about an ad cue not defined in this embodiment; and a value of 11 is reserved for purposes not defined in this embodiment.

The AD TYPE MASK field 525 is an exemplary 4-bit field indicating the type of ad or ads allowable in response to the ad cue. Each bit represents a different ad type: bit 0—Overlay; bit 1—Takeover; bit 2—Rich Media; and bit 3—Standard Banner. Any combination of these ad types may be specified in the AD TYPE MASK field 525.

The LIMIT field 530 is an exemplary 4-bit field indicating the maximum number of ads that may be played in response to the ad cue. It should be noted that, in the embodiment in FIG. 5, the LIMIT field 530 appears to be two separate fields, however, the field wraps around from one line to the next as displayed in the figure. The four bits of the field are actually contiguous.

The DURATION field 535 is an exemplary 16-bit field indicating the maximum duration, in seconds, of the ad or ads to be played in response to the ad cue. As with the LIMIT field 530, it should be noted that, in the embodiment in FIG. 5, the DURATION field 535 appears to be two separate fields, however, the field wraps around from one line to the next as displayed in the figure. The 16 bits of the field are actually contiguous.

The SIB field 540 is an exemplary 2-bit field indicating the Stream Insertion Behavior associated with delivery of the ad in response to the ad cue. A binary value of 00 indicates Do Nothing, signifying that the ad is not to be inserted into the primary stream (the stream containing the RTP header extension) but will be delivered by another means, such as a Standard Banner ad delivered to the user via HTTP; a binary value of 01 indicates Splice Over Content, signifying that the ad will be inserted into the primary media stream; a binary value of 10 indicates Treat as Playlist, signifying that ads will be played sequentially from a predetermined list; and a binary value of 11 is reserved for purposes not defined in this embodiment.

The SPLICE IN SEQUENCE OFFSET field 545 is an exemplary 12-bit field indicating the offset position, in number of RTP packets, of the splice in point (the point at which the ad will begin), with respect to the current RTP sequence number.

The SPLICE OUT SEQUENCE OFFSET field 550 is an exemplary 16-bit field indicating the offset position, in number of RTP packets, of the splice out point (the point at which the ad will end), with respect to the current RTP sequence number.

Many different arrangements of the various components depicted, as well as components not shown, are possible without departing from the spirit and scope of the present invention. Some embodiments of the present invention have been described with the intent to be illustrative rather than restrictive. Upon reading, and because of, this disclosure alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having embodied thereon computer-useable instructions that, when executed by a computing device, facilitate a method for delivering an ad to a user of a primary media stream, the method comprising:
   receiving a primary media stream that includes a transport protocol;
   identifying a cue point, defined in the transport protocol, for an ad to be inserted into at least one of the primary media stream or a secondary media stream, wherein the transport protocol includes an ad-type field that indicates a type of ad format that is allowable in response to the cue point;
   decoding a group of timing bits in the transport protocol to determine a delivery time of the ad with respect to a content of the primary stream;
   decoding a group of bits within the transport protocol to determine a starting point and an ending point of the ad with respect to a point in the primary media stream;
   selecting at least one of the primary media stream or the secondary media stream based on information in the transport protocol;
   selecting the ad based at least on the type of ad format that is allowable;
   inserting the ad by way of a splicer in at least one of the primary media stream or the secondary media stream that was selected, wherein the splicer is further operable to direct the media presentation device to retrieve the ad from the external source; and
   delivering the ad to the user.

2. The one or more nontransitory computer readable media of claim 1, the method further comprising initiating the secondary media stream in response to the cue point in the transport protocol.

3. The one or more nontransitory computer readable media of claim 1, wherein the primary media stream and the secondary media stream are selected from a group including unicast streams and multicast streams.

4. The one or more nontransitory computer readable media of claim 1, wherein the primary media stream includes at least one of a video or an audio within the transport protocol.

5. A system for delivering an ad to a user of a primary media stream, the system comprising:
   the primary media stream connected to a splicer;
   a transport protocol within the primary media stream, wherein the transport protocol defines a cue point at which the ad is to be delivered to the user, wherein the transport protocol includes one or more fields that define attributes of the cue point, wherein within the transport protocol is encoded a group of bits specifying at least one of a starting point and an ending point of the ad, with respect to a point in the primary media stream;
   a media presentation device operable to:
      A) receive at least one of the primary media stream or a secondary media stream,
      B) retrieve the ad from an external source other than the primary media stream and the secondary media stream, and
      C) present to the user at least one of the primary media stream, the secondary media stream, or the ad from the external source; and
   the splicer operable to:
      A) receive the primary media stream,
      B) identify the cue point, wherein identifying the cue point includes decoding a group of timing bits in the transport protocol to determine a delivery time of the ad with respect to a content of the primary stream;
      C) transmit the primary media stream to the user,
      D) transmit the ad to the user in at least one of the primary media stream or the secondary media stream based on information in the transport protocol, and
      E) direct the media presentation device to retrieve the ad from the external source.

6. The system of claim 5, wherein the primary media stream includes at least one of a video and an audio.

7. The system of claim 5, wherein the secondary media stream is initiated in response to the cue point in the transport protocol.

8. The system of claim 5, wherein the primary media stream and the secondary media stream are selected from a group including unicast streams and multicast streams.

9. One or more nontransitory computer-readable media having embodied thereon computer-useable instructions that, when executed by a computing device, facilitate a method of delivering an ad to a user of a primary media stream by way of a splicer, the method comprising:
   receiving the primary media stream, the primary media stream having, within a transport protocol, a transport protocol header extension that defines an ad cue point;

interpreting one or more fields within the transport protocol header extension that define attributes of the ad cue point, wherein a limit field indicates a maximum number of ads that may be played in response to the ad cue point, and wherein interpreting one or more fields that define attributes of the ad cue point includes decoding a group of timing bits to determine a delivery time of the ad; and transmitting the ad at the ad cue point in at least one of the primary media stream or a secondary media stream, based on information in the transport protocol header extension;

wherein the splicer is operable to direct the media presentation device to retrieve the ad from an external source.

10. The one or more nontransitory computer readable media of claim 9, wherein the secondary media stream is initiated in response to the ad cue point in the transport protocol header extension.

11. The one or more nontransitory computer readable media of claim 9, wherein the primary media stream and the secondary media stream are selected from a group including unicast streams and multicast streams.

12. The one or more nontransitory computer readable media of claim 9, wherein at least one of the primary media stream or the secondary media stream is received by a computing device operable to present at least one of the primary media stream or the secondary media stream to the user.

* * * * *